UNITED STATES PATENT OFFICE.

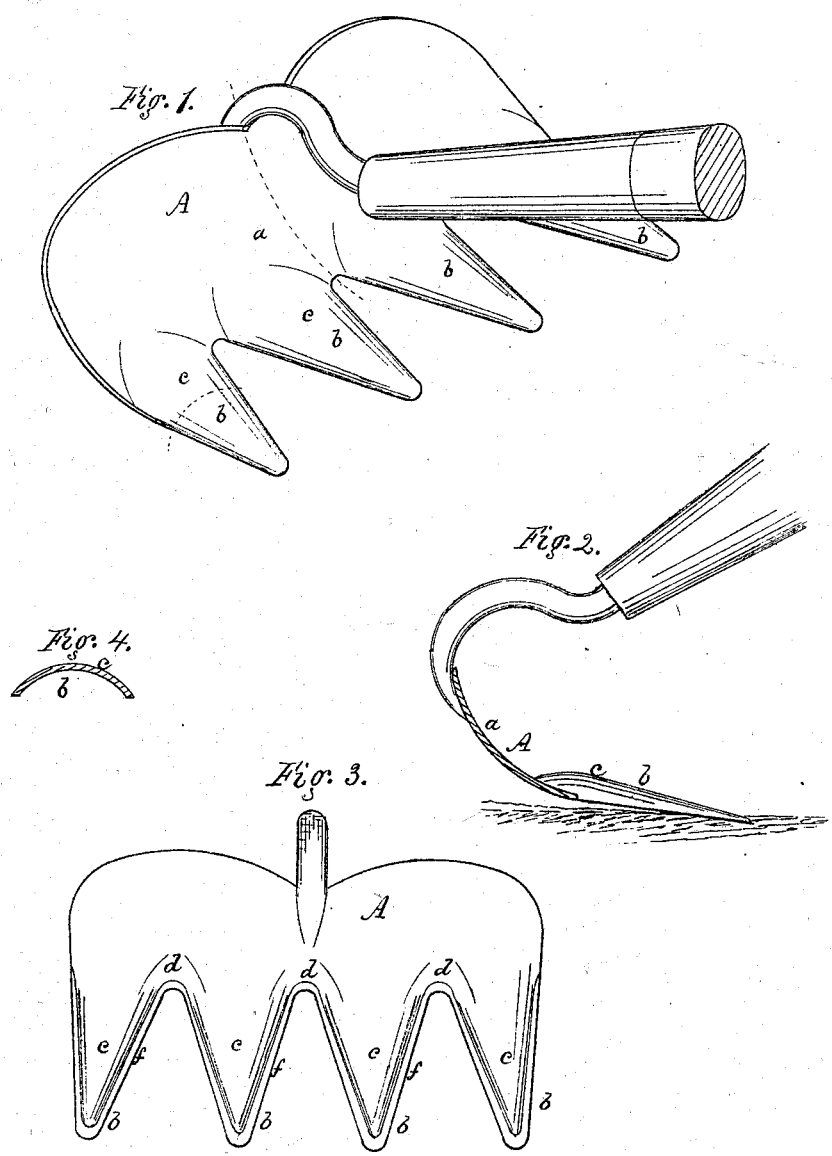

HARRY R. BARNES, OF ROCK STREAM, NEW YORK.

IMPROVEMENT IN HOES.

Specification forming part of Letters Patent No. 137,755, dated April 15, 1873; application filed September 16, 1872.

*To all whom it may concern:*

Be it known that I, HARRY R. BARNES, of Rock Stream, in the county of Yates and State of New York, have invented a certain Improvement in Hoes, of which the following is a specification:

Nature of the Invention.

This invention is an improvement on that patented by Philip and Henry E. Craps, August 6, 1861. It consists in giving a concave form to the hoe vertically, by which the teeth lie nearly, but not quite, flat in use, all as hereinafter described.

General Description.

In the drawing, Figure 1 is a perspective view; Fig. 2, a vertical section of the blade; Fig. 3, a bottom view; Fig. 4, a cross-section of one of the teeth.

A represents the blade of the hoe, which is of common form, with the exception that it is concave in vertical section, as shown at $a$, and the cutting-edge is formed into a series of teeth, $b\ b\ b$, which are of angular form, and made pointed at the extremities. These teeth are "struck up," or made corrugated, so as to present a ridge or swell upon the upper surface, extending from the point to a little distance back of the angle or junction of the teeth, as clearly indicated at $c\ c$. This leaves ridges or projections $d\ d$ above the angles or junctions of the teeth on the under side which come in the same plane with the cutting-edges $f\ f$ of the teeth.

The novelty in this invention consists in the concave form given to the blade. The corrugating of the teeth insures two advantages: First, it gives them strength and stiffness, by which they wear much longer, and obviates the springing and trembling under action that occurs when made plain and straight; second, it allows the cutting-edges of the teeth to be ground on a common grindstone for sharpening, which cannot be done when the teeth are flat. The bottom of the blade is simply placed upon a grindstone, and the teeth are all ground at once. As fast as the points are ground off the angles $d\ d$ are ground back by the projection of the ridges before described, and therefore the teeth always remain of the same relative length, and do not shorten, as would otherwise be the case. This is an important feature of my improvement, and the effect can be obtained only by striking up or corrugating the teeth, as described.

By making the hoe of the dishing or concave form described, the teeth lie nearly flat, but at the proper angle to strike and make their way into the soil of their own tendency with but slight pressure from the hands of the operator. In this respect they act similarly to the mold-board of a plow, or the teeth of a cultivator.

If made straight with the blade, as in the old device, the tendency of the teeth is to slide and jump over the surface of the ground without cutting.

This hoe in practical use has been found much more effective than the old form of hoe, requiring much less power to operate it; having a greater cutting capacity; holding the dirt equally well; and being of equal strength and wear, owing to the corrugating of the teeth. In all uses where deep digging is required, such as digging potatoes, &c., it is equally effective, as the points enter the soil much more readily than a square edge.

I do not claim, broadly, a hoe formed with a series of teeth on its cutting-edge. Neither do I claim, broadly, striking up or corrugating the teeth; but

What I claim, and desire to secure by Letters Patent, is—

As a new article of manufacture, the single-bladed hoe, having teeth on its cutting-edge struck up or corrugated, as described, when said teeth are turned or deflected inward from the blade of the hoe so as to stand at an angle thereto, and but slightly inclined from the surface of the soil, and be thereby self-entering at the drawing movement, and when said teeth have their edges made plain and straight from point to base, for the purpose of grinding, as herein shown and described.

In witness whereof I have hereunto signed my name in the presence of two subscribing witnesses.

HARRY R. BARNES.

Witnesses:
 CHARLES MILES,
 C. W. BARNES.